United States Patent [19]

Melcher et al.

[11] 4,300,646
[45] Nov. 17, 1981

[54] ELECTROMAGNETICALLY COMPENSATING PRECISION SCALE WITH FLEXURE FOR THERMAL EXPANSION

[75] Inventors: Franz-Josef Melcher, Hardegsen; Christoph Berg, Adelebsen; Erich Knothe, Boveden, all of Fed. Rep. of Germany

[73] Assignee: Sartorius GmbH, Fed. Rep. of Germany

[21] Appl. No.: 79,529

[22] Filed: Sep. 27, 1979

[30] Foreign Application Priority Data

Oct. 5, 1978 [DE] Fed. Rep. of Germany ... 7829724[U]

[51] Int. Cl.³ .................. G01G 7/00; G01G 3/18; G01G 3/08; G01G 21/28
[52] U.S. Cl. .................... 177/212; 177/226; 177/229; 177/244
[58] Field of Search ............... 177/210 EM, 212, 229, 177/244, 226

[56] References Cited

U.S. PATENT DOCUMENTS 4,062,416 12/1977 Berg et al. .............. 177/210 EM
4,148,370 4/1979 Luchinger et al. .......... 177/212 X
4,153,124 5/1979 Knothe et al. ............. 177/212 X

*Primary Examiner*—George H. Miller, Jr.
*Attorney, Agent, or Firm*—Eric P. Schellin

[57] ABSTRACT

An electromagnetically compensated precision scale has a load support guided for parallel movement by a guide assembly comprising upper and lower guides defining a triangular shape in plan connected to a housing and to the load support by flexible couplings, and wherein the guides are one-piece and define a vertical joint at the triangle apex, thereby reducing inaccurate readings caused by thermal effects.

6 Claims, 5 Drawing Figures

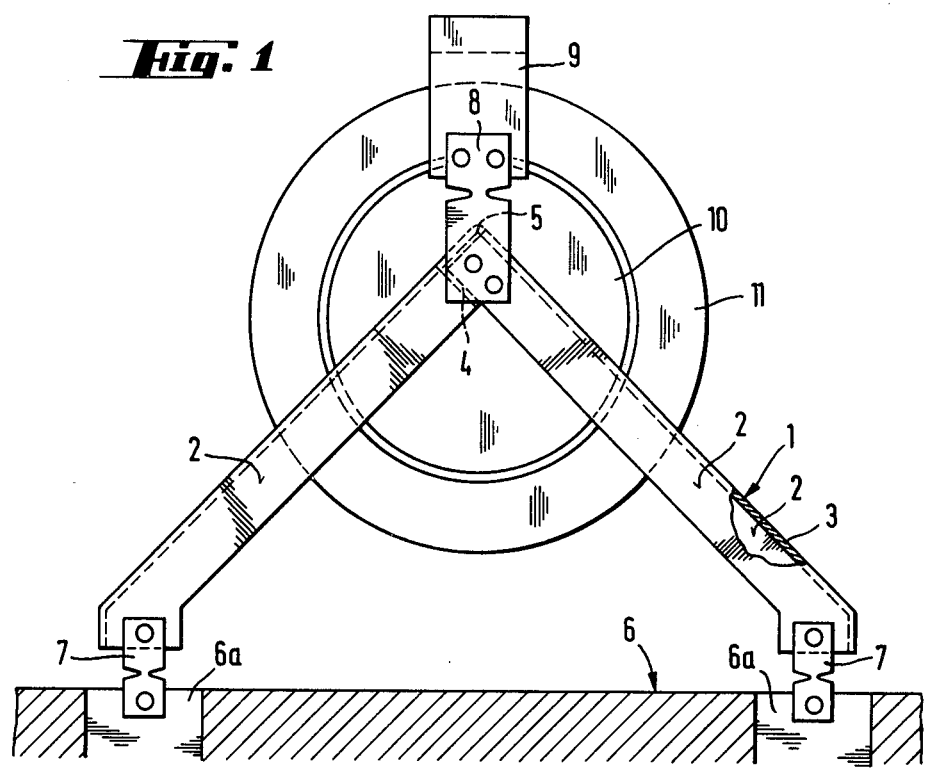
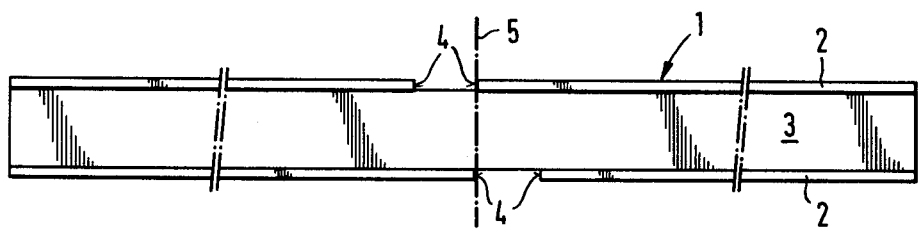

ELECTROMAGNETICALLY COMPENSATING PRECISION SCALE WITH FLEXURE FOR THERMAL EXPANSION

BACKGROUND OF THE INVENTION

The invention relates to an electomagnetically compensating precision scale with guides which are triangular in plan and are open toward the base of the triangle and in which a load support is carried by the guides for parallel motion. The guide ends are coupled by flexible joints to fixed points of the scale housing to which the guides are mounted, and at the apex of the triangle are coupled by a corresponding flexible joint with the load support.

THE PRIOR ART

The prior art is represented by U.S. Pat. Nos. 4,062,416 dated Dec. 13, 1977 and 4,153,124 dated May 8, 1979 and German DE-GM No. 7 115 570 (FIG. 2) dated Feb. 9, 1971.

In scales of this kind, the parallel motion is provided by upper and lower guides coupled together immediately in the area of the device for the electromagnetic load compensation. For reasons of a compact structure, the permanent magnet and the compensation coil cooperating therewith in the electromagnetic load compensation device are arranged in the free space between the upper and lower guides.

The compensation current conducted in the compensation coil produces, especially at a longer time of operation of the scale, a heating of the mechanical structural parts. In spite of the approximately equally high temperature coefficients of the guide material and the housing material, the guides are heated, due to their smaller mass and their larger surface, much more rapidly than the housing at the clamping points located on the base of the guides. The stationary material at the clamping points of the guide base are heated, due to their larger mass, less and more slowly than the guides proper. The result thereof is that the guides firmly clamped at the base cannot expand as much as would be necessary on the basis of their greater heating with respect to the fixed clamping points. Therefore, stresses are induced in the guide material, which in turn leads to inaccuracies in the weighing system. Such inaccuracies must be eliminated by expensive electronic means in order to avoid erroneous weighing results.

The guides serve to confine load displacement to parallel motion by flexure with little resistance as possible in a vertical direction and yet sufficiently rigid in transverse direction in order to be able to absorb horizontally acting forces. Thus, closed triangular guides (DE-GM No. 71155770) present a good lateral rigidity, but they are unsatisfactory in the sense of the aformentioned differential thermal expansion action.

Heretofore, the differential thermal expansion problem was dealt with by means of a guide structure not triangular but trapezoidal in plan view. In such structure, a trapezoid open along the base is involved to require two connectors for the load support along a side parallel spaced from the base.

SUMMARY OF THE INVENTION

The object of the invention is to improve a scale of a type having the aformentioned structure, purpose and differential thermal expansion problem and yet retain the rigidity of the guides in lateral direction.

This objective is achieved according to the invention by means of a scale wherein the guides are provided with one joint arranged in the area of the guide (triangle) apex at which the joint axis thereof extends vertically.

By this measure, the guides expand horizontally without material stress in dependence of the temperature, and without any loss of lateral rigidity.

BRIEF DESCRIPTION OF THE DRAWINGS

FIG. 1 is a diagrammatical plan view upon the essential elements of a scale according to the invention, whose triangular guide is hinged to the housing and to the load absorber;

FIG. 2 is a front view of a one-piece guide blank in straightened position;

DETAILED DESCRIPTION OF THE PREFERRED EMBODIMENT

Figure 3:
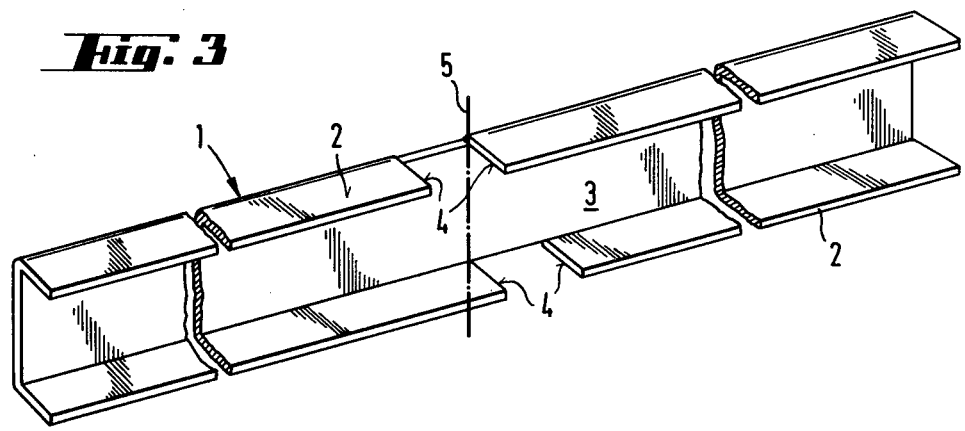
FIG. 3 is a perspective view corresponding to FIG. 2.

According to FIG. 1, guide 1 forms an upper guide as a part of a parallel guide structure for parallel motion of a scale with electromagnetic load compensation. Guide 1 is in the form of an isosceles triangle open toward its base and flexibly connected by means of resilient flexible bearings 7 at fixed points 6a of the housing 6, and by means of a further flexible bearing 8 at the guide point with the load support 9, which in turn forms the coupling to the correspondingly arranged lower guide (not shown). In the intermediate area between the upper and lower guides, the magnetic system is provided, which comprises a permanent magnet 11 and a compensation coil 10 connected with a bracket of load support 9, and in the state of operation acting against the load that acts upon load support 9. When the coil 10 is heated, the heat enters the sides of guides 1 and also the housing at the clamping points 6a, in which process, on the basis of the different temperature gradients of guide 1 and housing 6, the latter expands more slowly, so that the base of each guide 1 cannot expand to the extent as it would be necessary on the basis of the temperature conditions prevailing in guide 1.

According to FIGS. 1 to 4, guide 1 is formed by a sheet metal member which is U-shaped or channel shaped in cross section and comprises a web 3 with flanges 2 on the opposite edges thereof. By the arrangement of a joint 5 having a vertical flexure axis in the area of the triangle apex, the stresses otherwise induced in guide 1 are eliminated without sacrificing the rigidity of guide 1 in a horizontal direction. In the embodiment of FIG. 1, joint 5 is formed by the material in web 3 of guide 1, with the flanges 2 slit at 4, shown more distinctly in FIGS. 2 to 5, which slits extend across the flanges 2 to the vertical web 3 at the joint, so that in the shaping to a triangle according to FIG. 4, the horizontally extending flange portions 2 can engage each other in the area of the flexible joint 5. This assures, on the one hand, that the joint 5 is formed only by the wall thickness of the vertically extending web 3, and on the other hand, there is enough material in the area of the triangle apex to securely connect the resilient element 8.

Figure 4:
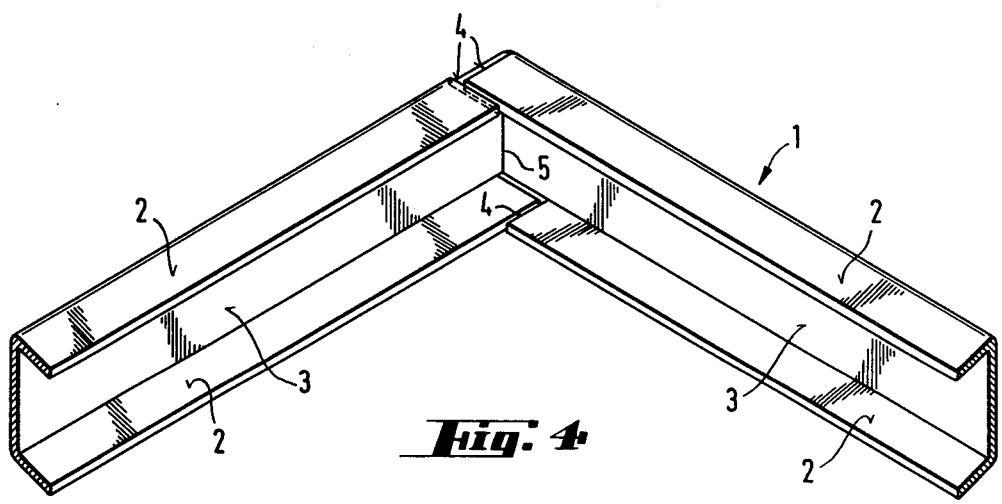
FIG. 4 is a perspective view of the guide according to FIGS. 2 and 3 with the guide bent to a triangular form.

As FIGS. 2 to 4 show, the slits 4 of the horizontal flange sections 2 are staggered with respect to flexible joint 5, so that the flange sections do not interfere with each other.

The guide is thus made of a single part without the adverse affect of connections between separate parts on rigidity of the guide.

In an embodiment not shown, joint 5 is not arranged, as shown, in the triangle apex of guide 1, but on one of the sides near the guide point.

Figure 5:
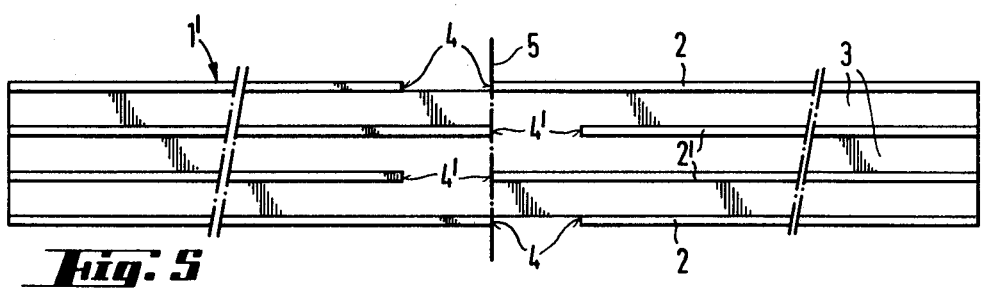
FIG. 5 is a modification of FIG. 2 with a plurality of webs or stiffening flanges.

In the embodiment of FIG. 5, the guide 1' is U-shaped in cross section, but has additional reinforcing flanges 2' spaced on the web 3 between outer flanges 2, and the additional flanges 2' are provided with corresponding slits or cut-outs 4'.

In the same manner, O-shaped, T-shaped, double T-shaped, L-shaped, and Z-shaped section shapes can be employed in place of section shapes which are U-shaped in cross section, so as to obtain the required joint.

We claim:

1. In an electromagnetically compensated precision scale, provided with a housing, a load support, upper and lower parallel guides interconnected with the load support for parallel guided movement of the load support, the guides each comprising a one-piece elongate member, shaped to define a triangle in plan view, with a base formed by the housing and an apex connected to the load support; the improvement residing in the apex being formed by a joint on the guide having a vertically extending flexure axis, whereby inaccuracies of the scale due to thermal effects thereon are reduced.

2. A scale as claimed in claim 1,
   each guide being shaped as a channel in transverse cross-section having a web,
   the web of the channel extending vertically and spaced horizontal flanges extending from the web.

3. A scale as claimed in claim 2, wherein the flanges are slit at the joint, the material of the web comprising the joint.

4. A scale as claimed in claim 3, the slits being shaped as miter slits open toward the base of the triangle.

5. A scale as claimed in claim 3, wherein the slits are staggered relative to one another along the web to minimize distortion of the guide.

6. In a precision scale provided with a fixed frame, a load support movable along a displacement path, a pair of spaced one-piece guide members, and flexible connectors anchoring each of the guide members at fixedly spaced locations to the frame and to the load support, the improvement residing in each of said guide members having a single flexure joint substantially parallel to said displacement path to form a triangular configuration with the frame in a plane perpendicular to said displacement path with an apex at the joint and a base extending between the connectors anchoring the guide member to the frame, said triangular configuration rendering the guide member rigid in said plane while stresses ordinarily induced by differential thermal expansion of the frame along the base and the guide member are eliminated by flexure of the guide member at the joint.

* * * * *